(12) United States Patent
Hall et al.

(10) Patent No.: US 7,462,051 B2
(45) Date of Patent: Dec. 9, 2008

(54) WIPER FOR TOOL STRING DIRECT ELECTRICAL CONNECTION

(76) Inventors: David R. Hall, 2185 S. Larsen Pkwy., Provo, UT (US) 84606; Scott Dahlgren, 2185 S. Larsen Pkwy., Provo, UT (US) 84606; Jonathan Marshall, 2185 S. Larsen Pkwy., Provo, UT (US) 84606; Tyson J. Wilde, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 12/125,522

(22) Filed: May 22, 2008

(65) Prior Publication Data

US 2008/0220664 A1    Sep. 11, 2008

Related U.S. Application Data

(60) Division of application No. 11/693,909, filed on Mar. 30, 2007, now Pat. No. 7,404,725, which is a continuation-in-part of application No. 11/621,183, filed on Jan. 9, 2007, and a continuation of application No. 11/428,445, filed on Jul. 3, 2006.

(60) Provisional application No. 60/894,395, filed on Mar. 12, 2007.

(51) Int. Cl.
*H01R 4/64* (2006.01)
(52) U.S. Cl. .......................................... 439/194
(58) Field of Classification Search ........... 439/190, 439/191, 194, 387, 426, 700; 166/65.1, 319
See application file for complete search history.

(56) References Cited

U.S. PATENT DOCUMENTS

| | | | |
|---|---|---|---|
| 2,414,719 A | 1/1947 | Cloud |
| 3,967,201 A | 6/1976 | Rorden |
| 4,416,494 A | 11/1983 | Watkins |
| 4,785,247 A | 11/1988 | Meador |
| 4,806,928 A | 2/1989 | Veneruso |
| 5,337,002 A | 8/1994 | Mercer |
| 6,223,826 B1 | 5/2001 | Chau |
| 6,367,564 B1 | 4/2002 | Mills |
| 6,392,317 B1 | 5/2002 | Hall |
| 6,446,728 B2 | 9/2002 | Chau |
| 6,651,755 B1 | 11/2003 | Kelpe |
| 6,655,464 B2 | 12/2003 | Chau |
| 6,670,880 B1 | 12/2003 | Hall |
| 6,717,501 B2 | 4/2004 | Hall |
| 6,739,413 B2 | 5/2004 | Sharp |
| 6,799,632 B2 | 10/2004 | Hall |

(Continued)

*Primary Examiner*—Khiem Nguyen
(74) *Attorney, Agent, or Firm*—Tyson J. Wilde

(57) ABSTRACT

In one aspect of the invention, a downhole electrical connection system comprises first and second tubular bodies adapted for threaded connection to each other, each tubular body comprising an inner and an outer diameter. First and second electrical conductor assemblies are disposed within the inner diameters of the tubular bodies and are substantially coaxial with the tubular bodies and generally extend the length of the tubular bodies. The first electrical conductor assembly comprises a first electrical contact adapted to abut a second electrical contact of the second electrical conductor assembly when the first and second tubular bodies are coupled together. The first electrical contact is disposed within an elastically deformable wiper, and the elastically deformable wiper is adapted to expose the first electrical contact as it is engaged by the second electrical contact under an axially compressive load.

20 Claims, 9 Drawing Sheets

U.S. PATENT DOCUMENTS

| | | |
|---|---|---|
| 6,821,147 B1 | 11/2004 | Hall |
| 6,830,467 B2 | 12/2004 | Hall |
| 6,844,498 B2 | 1/2005 | Hall |
| 6,845,822 B2 | 1/2005 | Chau |
| 6,888,473 B1 | 5/2005 | Hall |
| 6,913,093 B2 | 7/2005 | Hall |
| 6,929,493 B2 | 8/2005 | Hall |
| 6,945,802 B2 | 9/2005 | Hall |
| 6,968,611 B2 | 11/2005 | Hall |
| 7,028,779 B2 | 4/2006 | Chau |
| 7,150,329 B2 | 12/2006 | Chau |
| 7,404,725 B2 * | 7/2008 | Hall et al. .................... 439/194 |
| 2004/0104797 A1 | 6/2004 | Hall |
| 2004/0113808 A1 | 6/2004 | Hall |
| 2004/0145492 A1 | 7/2004 | Hall |
| 2004/0150532 A1 | 8/2004 | Hall |
| 2004/0164833 A1 | 8/2004 | Hall |
| 2004/0164838 A1 | 8/2004 | Hall |
| 2004/0216847 A1 | 11/2004 | Hall |
| 2004/0244916 A1 | 12/2004 | Hall |
| 2004/0244964 A1 | 12/2004 | Hall |
| 2004/0246142 A1 | 12/2004 | Hall |
| 2005/0001735 A1 | 1/2005 | Hall |
| 2005/0001736 A1 | 1/2005 | Hall |
| 2005/0001738 A1 | 1/2005 | Hall |
| 2005/0035874 A1 | 2/2005 | Hall |
| 2005/0035875 A1 | 2/2005 | Hall |
| 2005/0035876 A1 | 2/2005 | Hall |
| 2005/0036507 A1 | 2/2005 | Hall |
| 2005/0039912 A1 | 2/2005 | Hall |
| 2005/0045339 A1 | 3/2005 | Hall |
| 2005/0046586 A1 | 3/2005 | Hall |
| 2005/0046590 A1 | 3/2005 | Hall |
| 2005/0067159 A1 | 3/2005 | Hall |
| 2005/0070144 A1 | 3/2005 | Hall |
| 2005/0082092 A1 | 4/2005 | Hall |
| 2005/0092499 A1 | 5/2005 | Hall |
| 2005/0093296 A1 | 5/2005 | Hall |
| 2005/0095827 A1 | 5/2005 | Hall |
| 2005/0115717 A1 | 6/2005 | Hall |
| 2005/0145406 A1 | 7/2005 | Hall |
| 2005/0150653 A1 | 7/2005 | Hall |
| 2005/0161215 A1 | 7/2005 | Hall |
| 2005/0173128 A1 | 8/2005 | Hall |
| 2005/0212530 A1 | 9/2005 | Hall |
| 2005/0236160 A1 | 10/2005 | Hall |
| 2005/0284662 A1 | 12/2005 | Hall |

* cited by examiner

1100

```
┌─────────────────────────────────────────────────┐
│ Provide first and second tubular bodies adapted for │
│ threaded connection to each other, within each body an │
│ electrical conductor assembly being disposed substantially │
│ coaxially with body and extending the length of the body │
│                                            1101 │
└─────────────────────────────────────────────────┘
```

```
┌─────────────────────────────────────────────────┐
│ Provide an elastically deformable material that covers the │
│ first electrical contact when unengaged by the second │
│                  electrical contact.            │
│                                            1102 │
└─────────────────────────────────────────────────┘
```

```
┌─────────────────────────────────────────────────┐
│ Abut the first and second electrical contacts by threading │
│     together the first and second tubular bodies. │
│                                            1103 │
└─────────────────────────────────────────────────┘
```

```
┌─────────────────────────────────────────────────┐
│ Simultaneously expose the first electrical contact while │
│     abutting the first and second contacts by axially │
│ compressing the elastically deformable material with the │
│              second electrcal contact           │
│                                            1104 │
└─────────────────────────────────────────────────┘
```

Fig. 12

WIPER FOR TOOL STRING DIRECT ELECTRICAL CONNECTION

CROSS REFERENCES TO RELATED APPLICATIONS

This Patent Application is a divisional of U.S. patent application Ser. No. 11/693,909 filed Mar. 30, 2007, now U.S. Pat. No. 7,404,725 which is a continuation in-part of U.S. patent application Ser. No. 11/621,183 filed on Jan. 9, 2007 and entitled Tool String Direct Electrical Connection This application is also a continuation of U.S. patent application Ser. No. 11/428,445 filed on Jul. 3, 2006 and entitled Downhole Data and/or Power Transmission System. This application also claims priority to U.S. Provisional Patent Application Ser. 60/894,395 which was filed on Mar. 12, 2007 and entitled Horizontal Drilling. All of these applications are herein incorporated by reference in their entirety.

BACKGROUND OF THE INVENTION

The present invention relates to the field of data and/or power transmission. More specifically, it relates to the field of apparatus for transmitting data and/or power through such downhole tool strings.

Downhole tool strings have become increasingly versatile in the last half century. In addition to traditional oil, gas, and geothermic exploration and production purposes, tubular tool strings are often used for what is known as horizontal directional drilling to install underground power lines, communication lines, water lines, sewer lines, and gas lines. This sort of downhole drilling is particularly useful for boring underneath roadways, waterways, populated areas, and environmentally protected areas.

The increased versatility of downhole drilling with tool strings has led to a higher demand for apparatus that are able to transmit a power signal to downhole equipment as well as transmit data between downhole and surface tools. Hence, several different approaches to solving the problem of transmitting an electrical signal across the joints of a tool string have been developed and are known in the art.

U.S. Pat. Nos. 6,670,880; 6,983,485; and 6,939,493 to Hall, all of which are incorporated herein by reference for all that they disclose, teach of a system wherein tubular components are coupled at threaded joints in the tool string. Other downhole telemetry systems are disclosed in U.S. Pat. No. 6,688,396 to Floerke et al and U.S. Pat. No. 6,641,434 to Boyle et al, which are also herein incorporated by reference for all that they contain. U.S. Pat. No. 6,902,414 to Dopf et al.; U.S. Pat. No. 6,123,561 to Turner et al.; and U.S. Pat. No. 7,114,970 to Head, all of which are herein incorporated by reference for all that they contain, teach about methods of making electrical connections downhole.

BRIEF SUMMARY OF THE INVENTION

In one aspect of the invention, a downhole electrical connection system comprises first and second tubular bodies adapted for threaded connection to each other, each tubular body comprising an inner and an outer diameter. First and second electrical conductor assemblies are disposed within the inner diameters of the tubular bodies and are substantially coaxial with the tubular bodies and generally extend the length of the tubular bodies. The first electrical conductor assembly comprises a first electrical contact adapted to abut a second electrical contact of the second electrical conductor assembly when the first and second tubular bodies are coupled together. The first electrical contact is disposed within an elastically deformable wiper, and the elastically deformable wiper is adapted to expose the first electrical contact as it is engaged by the second electrical contact under an axially compressive load.

The electrical contacts may each comprise a planar contact surface disposed on a distal end of each assembly that is substantially perpendicular to the axis of the tubular bodies. The first and second electrical contacts may comprise contact surfaces areas of different sizes. The contact surface area of the first electrical contact may be less than 0.10 square inches. The contact area may also drive at 10,000 to 30,000 amps per square inch, preferably about 20,000 amps per square inch.

A surface of the electrical contacts may be planar and comprise a circular perimeter, an elliptical perimeter, a triangular perimeter, a trapezoidal perimeter, a hexagonal perimeter, a rectangular perimeter, a square perimeter, a diamond-shaped perimeter, or combinations thereof. The electrical contacts may each comprise the same perimeter geometries. The electrical contacts may comprise a material selected from the group consisting of tungsten carbide, beryllium copper, cemented metal carbide, hardened steel, copper, nickel, silver, gold, chromium, phosphorus, hard metal and combinations thereof.

Each electrical assembly may comprise a dielectric material selected from the group consisting of alumina, ferrite, polycrystalline diamond, carbon, and/or oxides of Mg, Al, Si, Yb, Ca, Be, Sr, Ns, Sm, Er, Eu, Sc, La, Gd, Dy, Tm, and combinations thereof. The electrical conductor assembly may comprise a coaxial cable, a pair of twisted wires, a biaxial cable, a triaxial cable, insulated copper wires, or combinations thereof. A plurality of electrical conductor assemblies may be disposed within the inner diameter of at least one tubular body. The tubular bodies may be selected from the group consisting of drill pipe, drill collars, subs, horizontal drill pipes, reamers, production pipe, injection pipe, upset drill pipe, and combinations thereof.

In some embodiments of the invention at least one electrical contact may be formed on a head of an electrical conductor assembly. At least a portion of the head may taper down to a contact surface. The head may comprise a stop adapted to oppose the axial compressive load. At least a portion of the head may be adapted to rotate the wiper under the axial compressive load. In some embodiments of the invention the elastically deformable wiper may be adapted to wipe a surface of the first and/or second electrical contact during engagement of the contacts. The deformable wiper may form a seal around an unengaged first contact. The compressive load may be at least 2,500 psi preferably 20,000 to 30,000 psi to remove debris or any other extraneous material from the contact surface areas.

In another aspect of the invention, a method of electrically coupling sections of a drill pipe comprises a step of providing first and second tubular bodies adapted for threaded connection to each other. Within each body an electrical conductor assembly is disposed substantially coaxially with the body and extends the length of the body. An elastically deformable wiper is provided that covers the first electrical contact when unengaged by the second electrical contact. The first and second electrical contacts are abutted by threading together the first and second tubular bodies. The method further comprises a step of simultaneously exposing the first electrical contact while abutting the first and second contacts by axially compressing the elastically deformable wiper with the second electrical contact. The method may further comprise a step of simultaneously wiping the first electrical contact with the elastically deformable wiper while abutting the first and second electrical contacts.

BRIEF DESCRIPTION OF THE DRAWINGS

FIG. 12 is a diagram of a method for electrically coupling drill pipe.

DETAILED DESCRIPTION OF THE INVENTION AND THE PREFERRED EMBODIMENT

Figure 1:
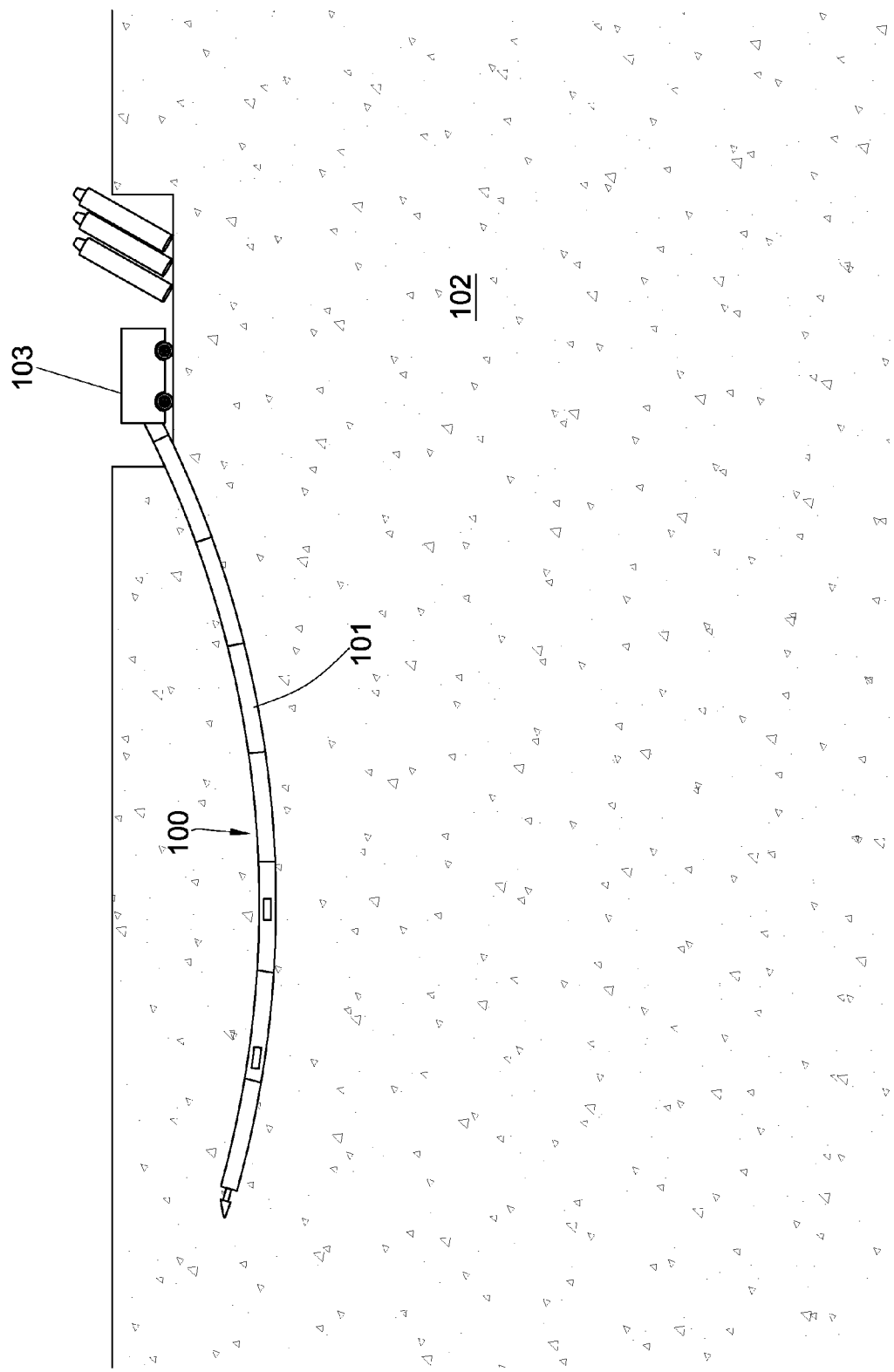
FIG. 1 is a cross-sectional diagram of an embodiment of a drill string in a horizontal drill well.

A drill string 100 may drill a bore hole 101 in subterranean formation 102 in a horizontal direction. In the embodiment of FIG. 1, a rig 103 is placed at the surface and is angled such that the drill string 100 penetrates the surface at a non-perpendicular angle. As the drill string 100 advances, the bore hole 101 gradually becomes generally parallel to the surface and then eventually returns to the surface at a predetermined location, at which time a back reamer may be attached to the drill string 100 and pulled back through the bore hole 101 in order to widen the hole for pipe and other tools to be inserted. Cables such as fiber optic or metal cables may also be attached to the drill string 100 as it is pulled back through the bore hole 101.

To accomplish horizontal directional drilling, the drill string 100 may comprise a steering mechanism. The steering mechanism may allow the drill string 100 to change direction while drilling, which may allow the drill string 100 to avoid known obstacles such as bodies of water or paved surfaces. Surface equipment, which may be part of the rig 103, may allow drill string operators to observe and manually control the direction of the bore hole 101.

Figure 2:
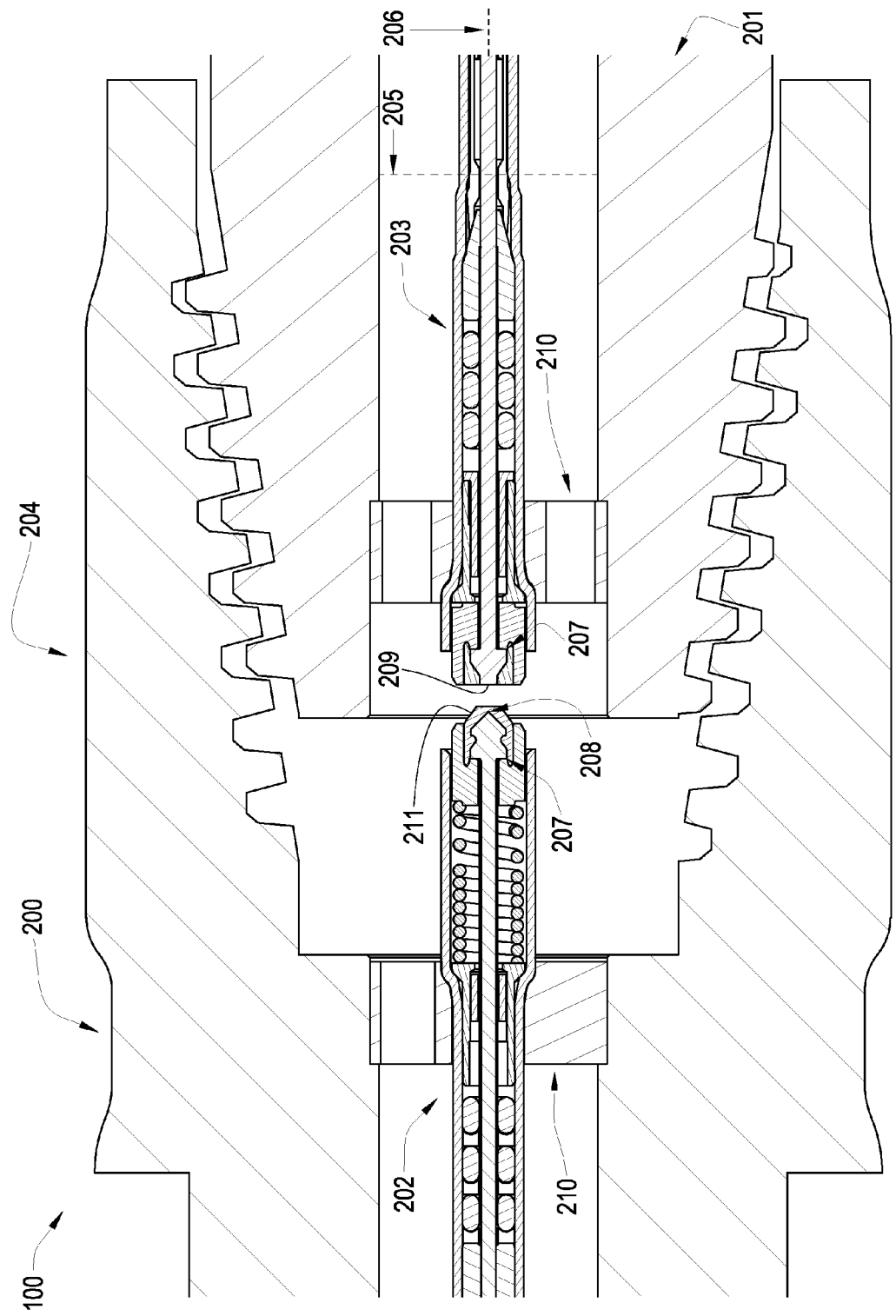
FIG. 2 is a cross-sectional diagram of an embodiment of electrical inductor assemblies in two tubular bodies being threaded together.

In order to provide power to downhole tools while drilling, the drill string 100 may comprise an electrical transmission system. Referring now to FIG. 2, a first tubular body 200 and a second tubular body 201 in a drill string may each comprise an electrical conductor assembly 202, 203. Tubular bodies 200, 201 may be selected from the group consisting of drill pipe, drill collars, subs, horizontal drill pipes, reamers, production pipe, injection pipe, upset drill pipe, and combinations thereof. The tubular bodies 200, 201 are adapted to thread together with one another at a connecting end 204.

The electrical conductor assemblies 202, 203 are disposed within an inner diameter 205 of each tubular body 200, 201 and along a central axis 206 of the tubular bodies 200, 201. The conductor assemblies 202, 203 extend from the connecting end 204 to another end of the tubular bodies 200, 201. The electrical conductor assemblies 202, 203 may each comprise a head 207 at the connecting end 204. First and second electrical contacts 208, 209 of conductor assemblies 202, 203 may be disposed on the head 207 of each assembly 202, 203. The electrical conductor assemblies 202, 203 may be configured to transmit an electrical signal, such as a power or data signal, from one end to another end. The electrical conductor assemblies 202, 203 may be substantially aligned to the central axis 206 by a stabilizing element 210. The stabilizing element 210 may be adapted to fit within a groove formed in the inner diameter 205 of a tubular body 200, 201. By substantially aligning the electrical conductor assemblies 202, 203 to the central axis 206, the assemblies 202, 203 may be coupled together to allow the transmission of the electrical signal between tubular bodies 200, 201. The first electrical contact 208 is disposed within an elastically deformable wiper. When the first contact 208 is not engaged with the second contact 209 the wiper 211 forms a seal around the unengaged first contact 208. In some embodiments of the invention a plurality of electrical conductor assemblies 202, 203 may be disposed with the inner diameter 206 of one tubular body 200, 201.

Figure 3:
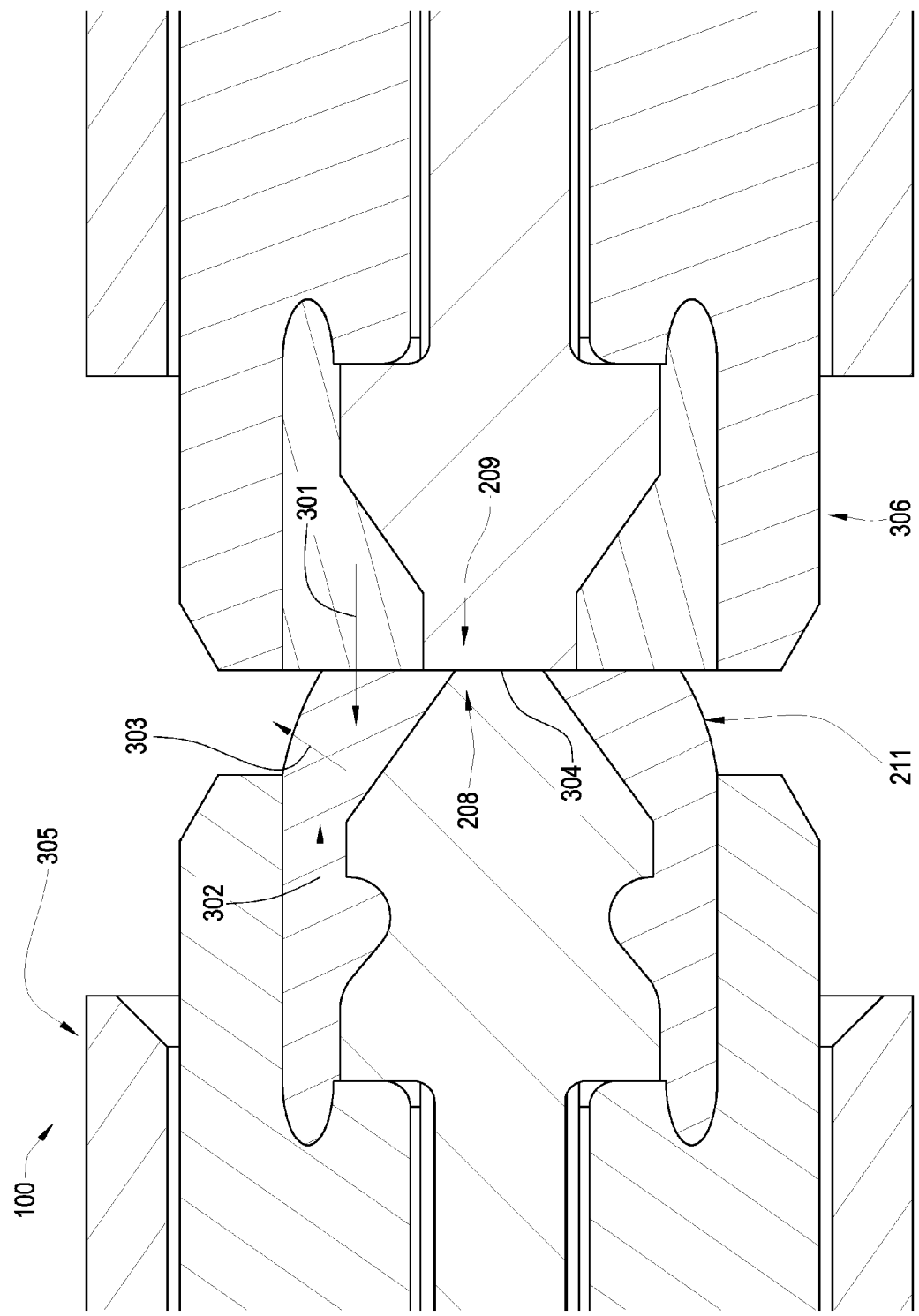
FIG. 3 is a cross-sectional diagram of an embodiment of mated electrical conductor assemblies in two tubular bodies that are threaded together.

Referring to FIG. 3, when the tubular bodies 200, 201 are fully threaded together the first and second electrical contacts 208, 209 abut one another and make physical and electrical contact. The threaded coupling of the tubular bodies 200, 201 places an axially compressive load 301, 302 on the abutting contacts 208, 209. The mutually opposing compressive forces 301, 302 compress the elastically deformable wiper 211 in an axial direction 303, causing the wiper 211 to expose the first electrical contact 208 and simultaneously wipe clean the surfaces of the first and/or second electrical contacts 208, 209 as the wiper compresses. Friction caused by the receding wiper 211 as it exposes the first electrical contact 208 dislodges materials from the contacts 208, 209 that may interfere with the transmission of electrical signals. Further the compressed wiper now acts as a seal which prevents drilling mud from contacting the electrical contacts. Some drilling muds may be electrically conductive enough to short the electrical signal if the drilling mud is exposed to the electrical contacts. Also the compressed wiper keeps the electrical contacts clean while engaged. As the tool string components are decoupled, the axial compressive load on the wipers lessens allowing the wiper to decompress and resume its former position where it covers the electrical contact's surface area.

As shown in FIG. 3, the electrical contacts 208, 209 may each comprise a planar contact surface 304 that is disposed on a distal end of each assembly. The contact surface 304 may be substantially perpendicular to the axis 206 of the tubular bodies 200, 201. In addition, the first and second electrical contacts 208, 209 may comprise contact surface areas of different sizes. It is believed that a small contact surface area may contribute to more axial compression and thereby to a better electrical connection. In some embodiments of the invention the axial compressive load may be at least 2,500 psi. Having a small first electrical contact 208 abutted against a larger second electrical contact 209 may allow for this small contact surface area without jeopardizing the stability of the connection. Some embodiments of the invention may comprise a contact surface area of no more than 0.15 square millimeters. In some embodiments, at least a portion of the head 207 may taper down to the contact surface 304. The first electrical conductor assembly 202 may be in electrical communication with a data or power source, which may be located at the surface or downhole, and the second electrical conductor assembly 203 may provide a return path through earth.

The electrical contacts may comprise a material selected from the group consisting of tungsten carbide, beryllium copper, cemented metal carbide, hardened steel, copper, nickel, hard metal, and combinations thereof. A corrosion resistant material such as beryllium copper may be used. In some embodiments, the electrical conductor assembly comprises a coaxial cable comprising a first electrical conductor and a second electrical conductor separated by a dielectric material 306. In some embodiments, the electrical conductor assemblies 202, 203 may comprise, a pair of twisted wires, a biaxial cable, a triaxial cable, insulated copper wires, or combinations thereof. The conductor assemblies 202, 203 may further comprise a stainless steel conduit 305 fitted around the coaxial cable or other electrical cable. In some embodiments, a diameter of the conduit is reduced to hold the shield, dielectric material and core in radial compression so that these components of the cable may stretch uniformly together. The conduit 305 may protect the conductor assemblies 202, 203 from corrosive downhole fluids and/or mechanical damage. In addition, the stainless steel conduit 305 may help the assemblies 202, 203 to make a coaxial connection at the connecting end 204. The stainless steel conduit 305 may also shield the electrical signal as it passes from one electrical contact to the other. This provides the advantage of keeping the power and/or data signals clean and undistorted while they are traveling through the electrical conductor assemblies. In some embodiments of the invention dielectric materials 306 may be selected from the group consisting of alumina, ferrite, polycrystalline diamond, carbon, and/or oxides of Mg, Al, Si, Yb, Ca, Be, Sr, Ns, Sm, Er, Eu, Sc, La, Gd, Dy, Tm, and combinations thereof.

Springs such as a plurality of wave springs, Belleville springs, coiled springs or combinations thereof may be disposed between the dielectric material 306 and a thrust shoulder anchored against a flaring of the stainless steel armoring 305. The flaring may serve as an anchor for the conductor assemblies 202, 203. The resilient material may spring-load the electrical contacts 208, 209 to allow a sufficient axial load on the engaged connection to permit good connectivity between the electrical contacts 208, 209. The spring-load may comprise a compressive load of at least 1000 psi, preferably at least 20,000 to 30,000 psi or more. For hard materials, more psi may be desired. Seals such as o-rings may be disposed intermediate the armoring 305 and the dielectric material 306 to prevent undesirable fluids from entering the inner structure of the conductor assemblies 202, 203.

Figure 4:
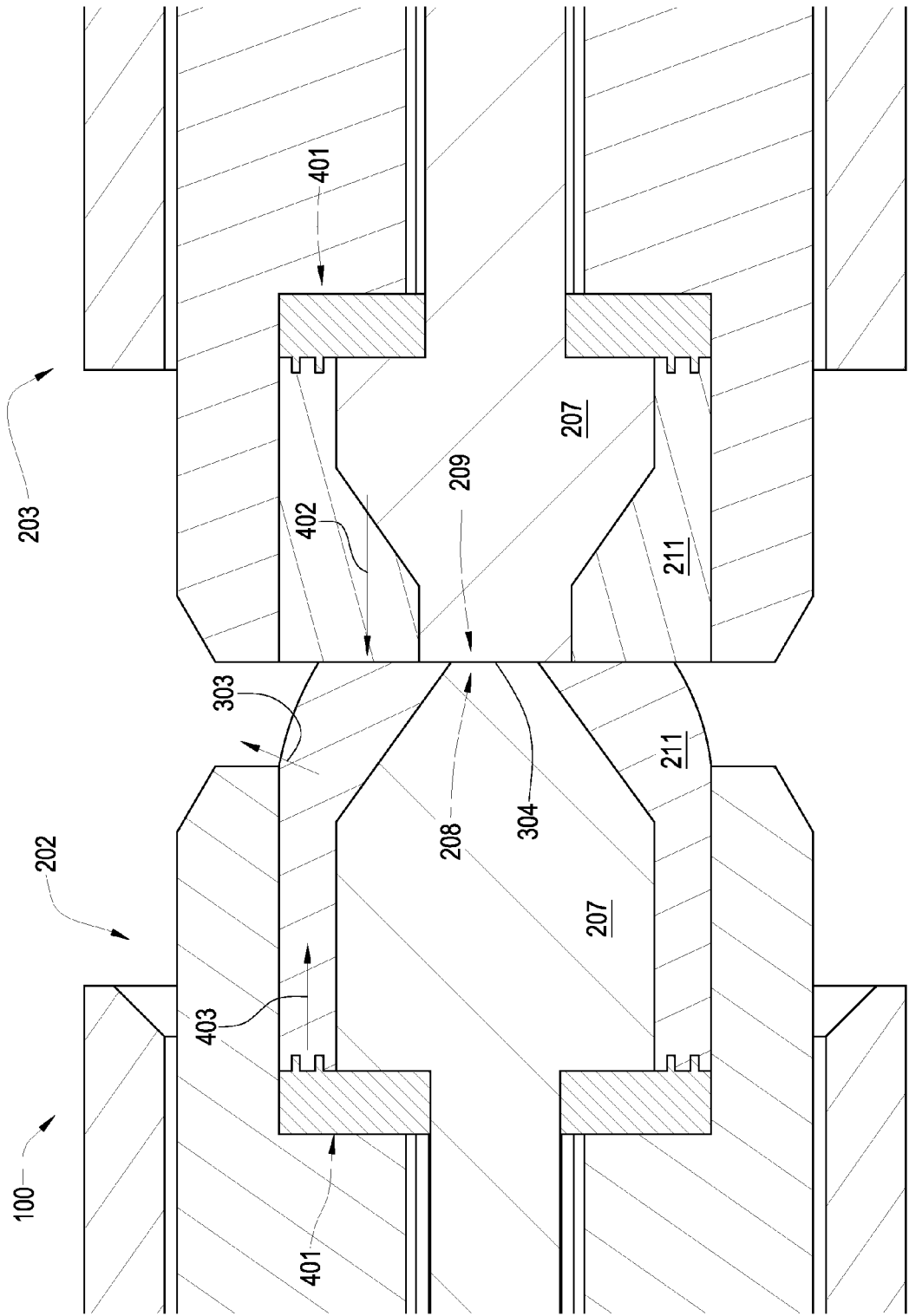
FIG. 4 is a cross-sectional diagram of another embodiment of mated electrical conductor assemblies in two tubular bodies that are threaded together.

Referring now to FIG. 4, the head 207 may comprise a stop 401 that is adapted to oppose the axial compressive force 402 on the wiper 211. As the tubular bodies 200, 201 are threaded together the axial compressive force 402 may push the wiper 211 back away from the contact surface 304. The stop 401 may force the wiper 211 to compress verses moving backwards An annular stop secured to the head may be beneficial where the electrical contacts 208, 209 comprise a material that is difficult to machine. Although FIG. 4 discloses a single electrical connection of two electrical conducting assemblies 202, 203 in a single drill line 100, any numbers of electrical connections may be used. In some embodiments of the invention a single tubular body 200, 201 may comprise a plurality of electrical conducting assemblies 202, 203. In some embodiments of the invention the conducting assemblies 202, 203 may be eccentric to the axis 206 of the tubular bodies 200, 201.

Figure 5:
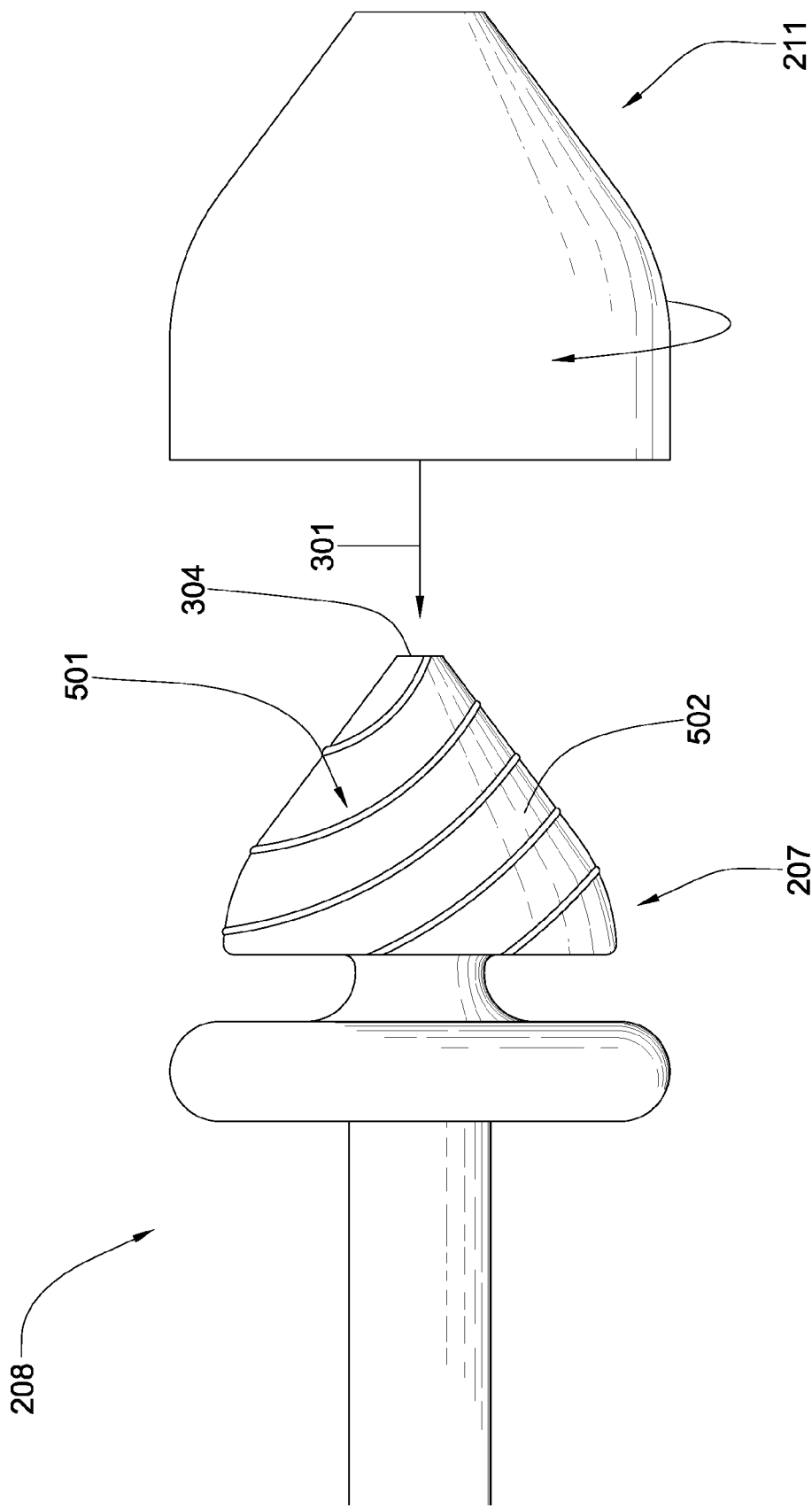
FIG. 5 is an exploded diagram of an embodiment of electrical contact and a wiper.

Referring now to FIG. 5, a portion of the head 207 comprises a profile that is adapted to rotate the wiper 211 when the wiper 211 is placed under the axial compressive load 301. The profile may be ridges 501 or grooves that may be formed on a surface 502 of the head 207. Corresponding grooves or ridges (not shown) may be formed on the inside of the wiper 211. As the axial compressive load 301 engages the wiper 211, the wiper may be forced to compress and twist thus providing a dual wiping action on either of the contact surfaces.

Figure 6:
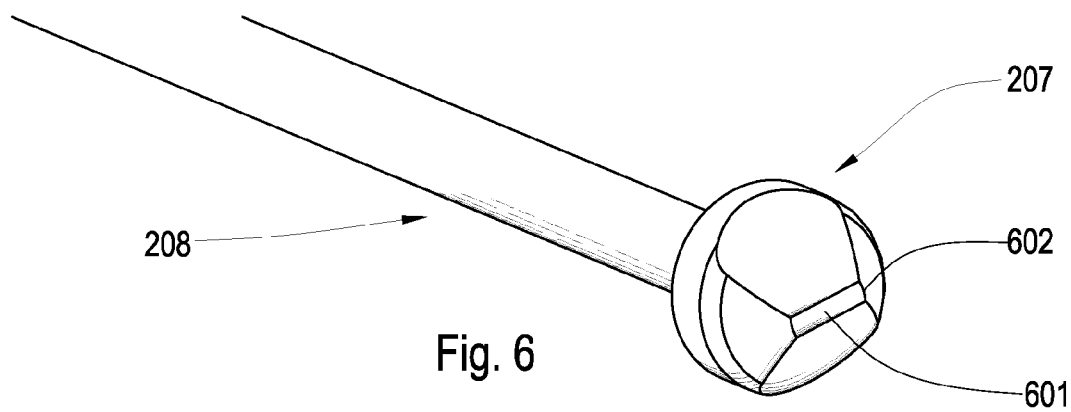
FIG. 6 is a perspective diagram of an embodiment of an electrical contact.
Figure 7:
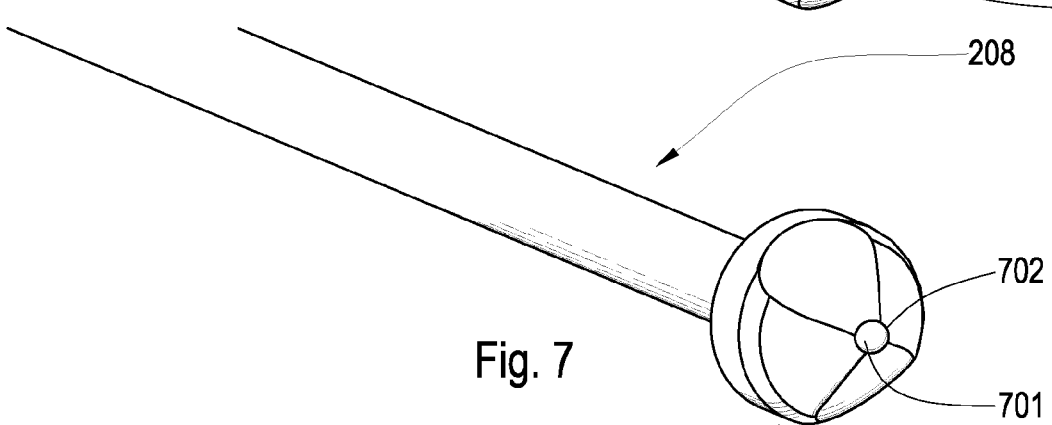
FIG. 7 is a perspective diagram of another embodiment of an electrical contact.
Figure 8:
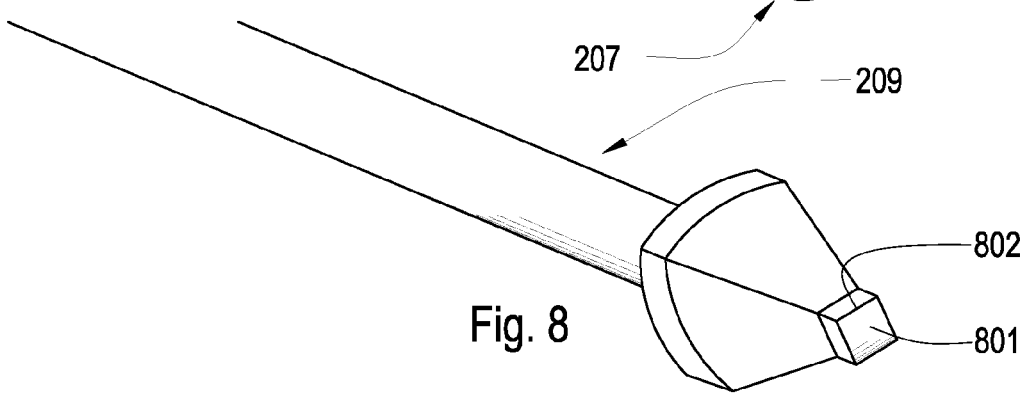
FIG. 8 is a perspective diagram of another embodiment of an electrical contact.
Figure 9:
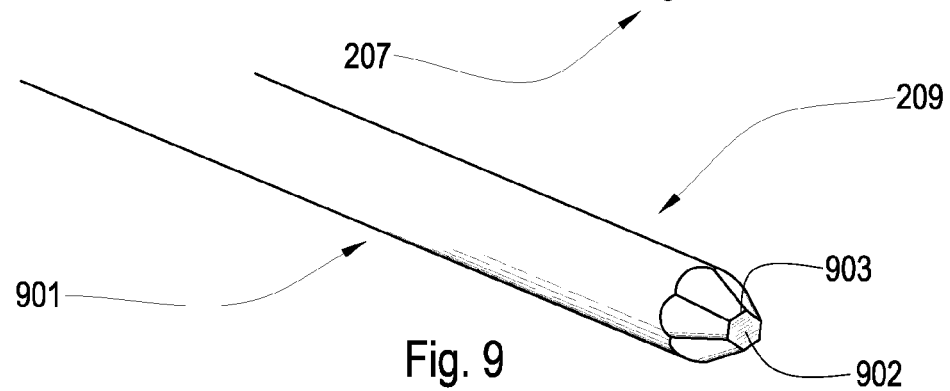
FIG. 9 is a perspective diagram of another embodiment of an electrical contact.

FIGS. 6 through 9 disclose various embodiments of electrical contacts 208, 209 and contact surfaces 304. FIG. 6 discloses a perspective view of an embodiment of an electrical contact 208 with a head 207. The head comprises a contact surface 601 with a generally rectangular perimeter 602. FIG. 7 discloses an electrical contact 208 with a head 207, and a contact surface 701 with a generally circular perimeter 702. The head 207 tapers down to the contact surface 701. FIG. 8 discloses an electrical contact 209 with a head 207 that tapers but that stops tapering before it reaches the contact surface 801. The contact surface 801 comprises a generally diamond-shaped perimeter 802. In FIG. 9 the contact 209 comprises a central shaft 901 that tapers down to a contact surface 902 with a hexagonal perimeter 903. In some embodiments of the invention the contact surface 304 may be planar and comprise a circular perimeter, an elliptical perimeter, a triangular perimeter, a trapezoidal perimeter, a hexagonal perimeter, a rectangular perimeter, a square perimeter, a diamond-shaped perimeter, or combinations thereof. Although specific contact surfaces 304 with specific perimeters have been shown in specific combination with electrical contacts 208, 209, other combinations of perimeters, surfaces 304, and contacts 208, 209 may be compatible with the present invention.

Figure 10:
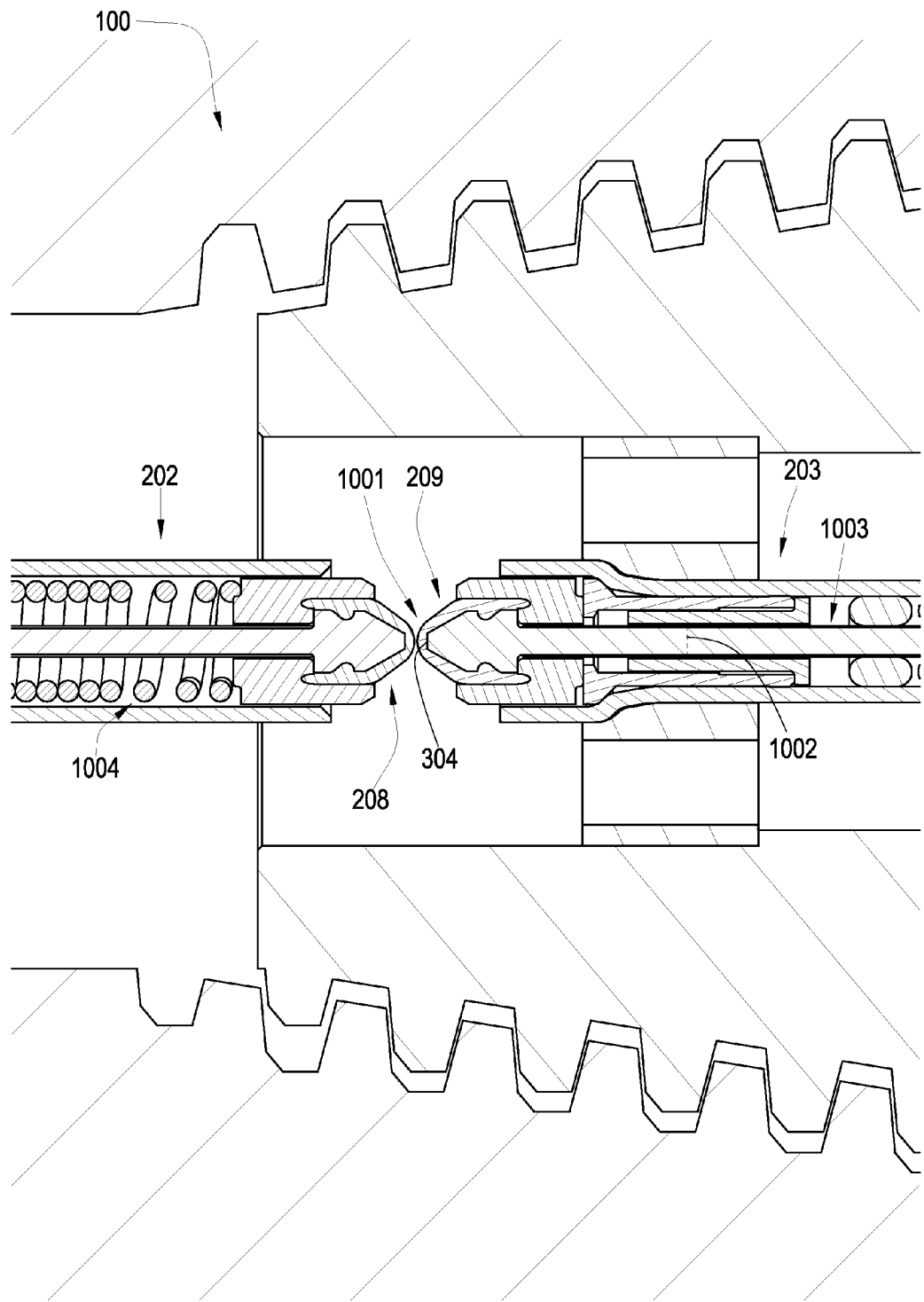
FIG. 10 is a cross-sectional diagram of another embodiment of electrical conductor assemblies in two tubular bodies threaded together.

Referring now to FIG. 10, an embodiment of the invention is disclosed in which the first electrical contact 208 and the second electrical contact 209 each comprise the same contact perimeter geometry 1001. In some embodiments, an electrical connection may have a smaller surface area than a cross-sectional surface area of the shaft 1003 of the electrical assemblies 202, 203. The cross-sectional surface area is represented by line 1002. Small contact surfaces 304 may be used most efficiently in some embodiments where both electrical contacts 208, 209 have the same contact surface area and perimeter geometry 1001. FIG. 10 also discloses a spring 1004 that may be disposed in the electrical conducting assembly 202 or in both assemblies 202, 203. The spring 1004 is believed to allow the electrical contacts 208, 209 to abut without fracturing either contact 208, 209. In addition, the spring 1004 may help to maintain the axial compressive load. The embodiment of FIG. 9 also discloses that both electrically conductive assemblies comprise a wiper.

Figure 11:
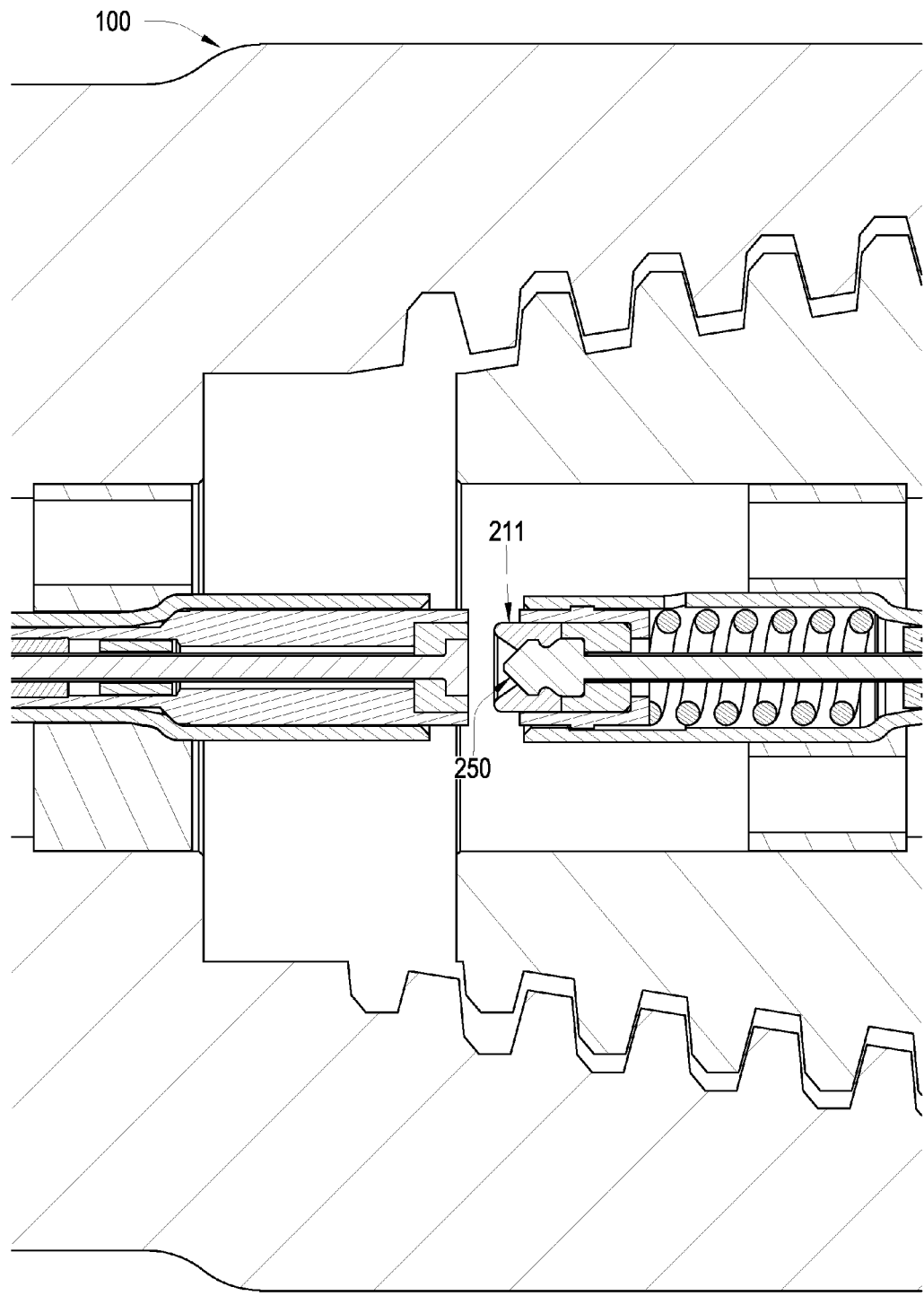
FIG. 11 is a cross-sectional diagram of another embodiment of an electrical connection.

Now referring to FIG. 11, the wiper 211 comprises an open cavity 250 which exposes a portion of the electrical contacts.

FIG. 12 discloses a method 1100 of electrically coupling sections of a tool string. The method comprises a step 1101 of providing first and second tubular bodies 200, 201 adapted for threaded connection to each other. Within each body an electrical conductor assembly 202, 203 is disposed substantially coaxially with the body 200, 201 and extends along the length of the body. The method 1100 also comprises a step 1102 of providing an elastically deformable wiper 211 that covers the first electrical contact 208 of the first assembly 202 when unengaged by the second electrical contact 209 of the second assembly 203. The method 1100 comprises a further steps 1103 of abutting the first and second electrical contacts 208, 209 by threading together the first and second tubular bodies 200, 201 and 1103 of simultaneously exposing the first electrical contact 208 while abutting the first and second contacts 208, 209 by axially compressing the elastically deformable wiper 211 with the second electrical contact 209. The method 1100 may further comprise a step of simultaneously wiping the first electrical contact 208 with the elastically deformable wiper 211 while abutting the first and second electrical contacts 208, 209.

Whereas the present invention has been described in particular relation to the drawings attached hereto, it should be understood that other and further modifications apart from those shown or suggested herein, may be made within the scope and spirit of the present invention.

What is claimed is:

1. A method of electrically coupling sections of a drilling tubulars, comprising:
    providing first and second tubular bodies adapted for threaded connection to each other, within each body an electrical conductor assembly extending the length of the body;
    providing an elastically deformable wiper that covers a first electrical contact;
    exposing the first electrical contact by axially compressing the elastically deformable wiper with a second electrical contact.

2. The method of claim 1, further comprising a step of simultaneously wiping the first electrical contact with the elastically deformable wiper while abutting the first and second electrical contacts.

3. The method of claim 1, wherein the electrical conductor assembly is substantially coaxial with the body.

4. The method of claim 1, wherein the method further includes the step of abutting the first and second electrical contacts by threading together the first and second tubular bodies.

5. The method of claim 1, wherein the step of compressing exceeds 500 psi.

6. The method of claim 1, wherein the deformable wiper forms a seal around an first contact.

7. The method of claim 1, wherein the elastically deformable wiper is adapted to wipe a surface of the first electrical contact during engagement of the contacts.

8. The method of claim 1, wherein at least one of the first and second electrical contacts is formed on a head of an electrical conductor assembly.

9. The method of claim 8, wherein at least a portion of the head tapers down to a contact surface.

10. The method of claim 8, wherein the head comprises a stop adapted to oppose the axial compressive load.

11. The method of claim 8, wherein at least a portion of the head is adapted to rotate the wiper under the axial compressive load.

12. The method of claim 1, wherein the electrical conductor assembly comprises a coaxial cable, a pair of twisted wires, a biaxial cable, a triaxial cable, insulated copper wires, or combinations thereof.

13. The method of claim 1, wherein the first and second electrical contacts comprise contact surface areas of different sizes.

14. The method of claim 1, wherein the electrical contacts each comprise a planar contact surface disposed on a distal end of each assembly that is substantially perpendicular to the axis of the tubular bodies.

15. The method of claim 1, wherein a contact surface area of the first electrical contact is less than 0.15 square millimeters.

16. The method of claim 1, wherein the drilling tubulars are selected from the group consisting of drill pipe, drill collars, subs, horizontal drill pipes, reamers, injection pipe, upset drill pipe, and combinations thereof.

17. The method of claim 1, wherein the first electrical contact is spring-loaded.

18. The method of claim 1, wherein the second electrical contact is also spring-loaded.

19. A method of electrically coupling sections of a drill pipe, comprising:
    providing first and second tubular bodies adapted for threaded connection to each other, within each body an electrical conductor assembly being disposed substantially coaxially with the body and extending the length of the body;
    providing an elastically deformable wiper that covers a first electrical contact when unengaged by a second electrical contact;
    abutting the first and second electrical contacts by threading together the first and second tubular bodies; and
    simultaneously exposing the first electrical contact while abutting the first and second contacts by axially compressing the elastically deformable wiper with the second electrical contact.

20. The method of claim 18, further comprising a step of simultaneously wiping the first electrical contact with the elastically deformable wiper while abutting the first and second electrical contacts.

* * * * *